US007035397B2

(12) United States Patent
Diethorn

(10) Patent No.: US 7,035,397 B2
(45) Date of Patent: Apr. 25, 2006

(54) SYSTEM AND METHOD FOR UPDATING FILTER COEFFICIENTS AND ECHO CANCELLER INCLUDING SAME

(75) Inventor: Eric J. Diethorn, Long Valley, NJ (US)

(73) Assignee: Agere Systems Inc., Allentown, PA (US)

( * ) Notice: Subject to any disclaimer, the term of this patent is extended or adjusted under 35 U.S.C. 154(b) by 577 days.

(21) Appl. No.: 09/952,292

(22) Filed: Sep. 14, 2001

(65) Prior Publication Data

US 2003/0053617 A1    Mar. 20, 2003

(51) Int. Cl.
*M04M 9/08*    (2006.01)
(52) U.S. Cl. .......................... 379/406.01; 379/406.02; 379/406.05; 379/406.06; 379/406.08; 379/406.09
(58) Field of Classification Search ............................... 379/406.01–406.16
See application file for complete search history.

(56) References Cited

U.S. PATENT DOCUMENTS

| 4,591,669 | A | * | 5/1986 | Duttweiler et al. | .... 379/406.08 |
| 4,922,530 | A | * | 5/1990 | Kenney et al. | ........ 379/406.08 |
| 5,610,909 | A | | 3/1997 | Shaw | |
| 5,664,011 | A | * | 9/1997 | Chochiere et al. | ..... 379/406.08 |
| 6,337,907 | B1 | * | 1/2002 | Laberteaux et al. | ... 379/406.08 |
| 6,614,907 | B1 | * | 9/2003 | Laberteaux et al. | ... 379/406.03 |

FOREIGN PATENT DOCUMENTS

EP         0422796 A2 *  4/1991

JP         9-130306 A  *  5/1997

OTHER PUBLICATIONS

"Comparison of Different Adaptive Algorithms for Stereophonic Acoustic Echo Cancellation" by Peter Eneroth, Jacob Benesty, Thomas Gansler, and Steven Gay; Proc. EUSIPCO, 2000, 4 pg.
"An Inplementation of a Stereophonic Acoustic Echo canceler on a General Purpose DSP" by Peter Eneroth, Steven Gay, Tomas Gansler and Jacob Benesty; Proc. ICSPAT; 1999; 5 pg.
"Echo Canceler with Two Echo Path Models" by Kazuo Ochiai, Takashi Araseki and Takashi Ogihara; IEEE Transactions on Communications; Jun. 1977; pp. 589-595.

* cited by examiner

*Primary Examiner*—Sinh Tran
*Assistant Examiner*—Ramnandan Singh

(57) ABSTRACT

A system for updating filter coefficients for use with an echo canceller, a related method for updating filter coefficients and an echo canceller including the system or the method. In one embodiment, the echo canceller has a nonadaptive filter and an adaptive filter, the nonadaptive filter having nonadaptive filter coefficients and configured to develop a nonadaptive error signal as a function of the nonadaptive filter coefficients, and the adaptive filter having adaptive filter coefficients and configured to develop an adaptive error signal as a function of the adaptive filter coefficients. The system includes a monitoring subsystem configured to monitor a quality of the nonadaptive and adaptive error signals and a selection subsystem configured to select one of the nonadaptive and adaptive filter coefficients for use by the nonadaptive filter based on the quality of the nonadaptive and adaptive error signals.

21 Claims, 2 Drawing Sheets

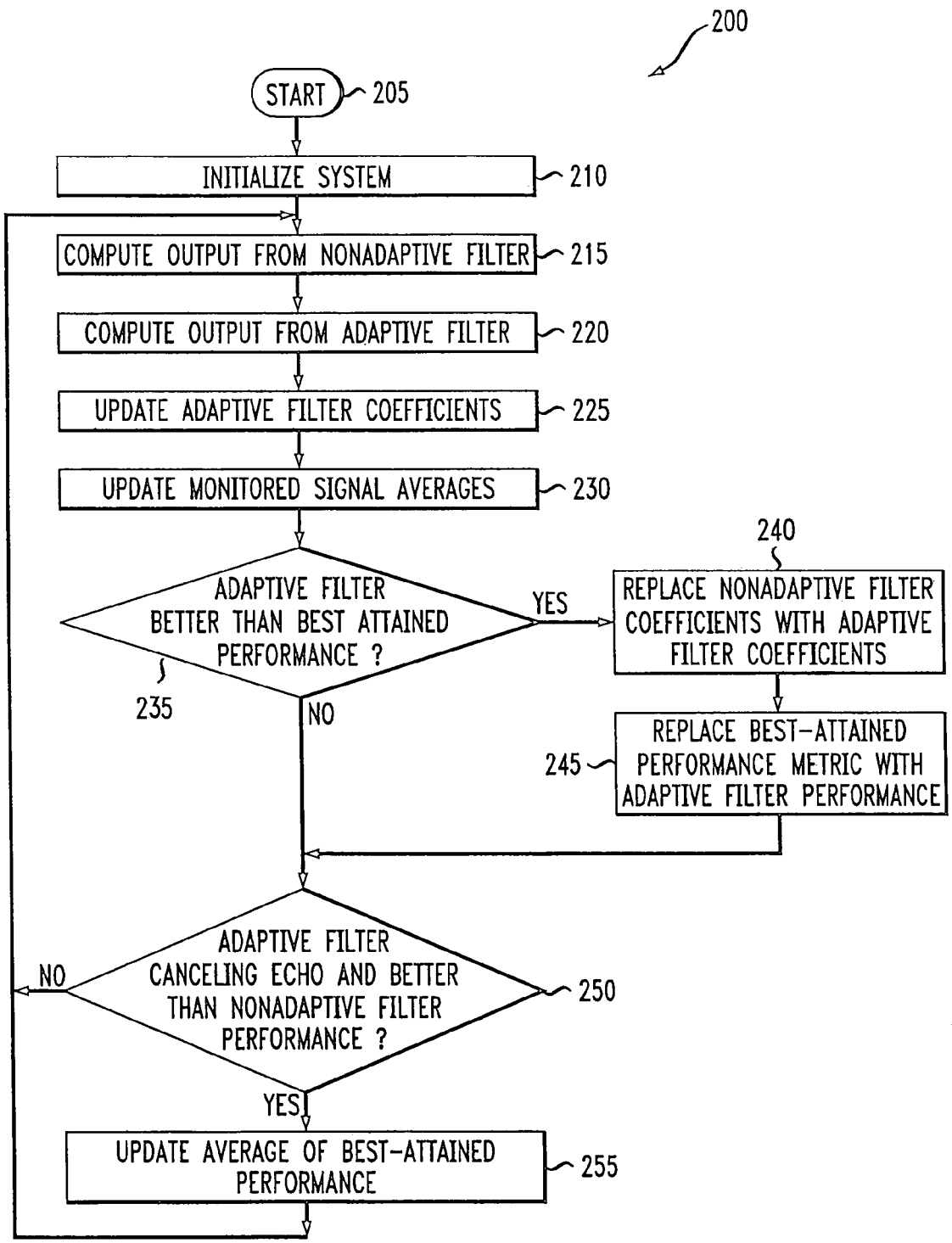

SYSTEM AND METHOD FOR UPDATING FILTER COEFFICIENTS AND ECHO CANCELLER INCLUDING SAME

TECHNICAL FIELD OF THE INVENTION

The present invention is directed, in general, to signal echo cancellation and, more specifically, to a system and method for updating filter coefficients in two-path echo cancellers and an echo canceller including the same.

BACKGROUND OF THE INVENTION

Speech typically results in reflected waves. When the reflected wave arrives a very short time after a direct sound, it is perceived as a spectral distortion or reverberation. However, when the reflection arrives a few tens of milliseconds (ms) after the direct sound (i.e., a relatively long period of time), it is heard as a distinct echo. Such echoes may be annoying, and under extreme conditions can completely disrupt a conversation.

Line echoes (i.e., electrical echoes) typically occur in telecommunications networks due to impedance mismatches at hybrid transformers that couple two-wire local customer loops to four-wire long-distance trunks. Ideally, the hybrid transformers pass the far-side signal at the four-wire receive port through to the two-wire transmit port without allowing leakage into the four-wire transmit port. However, this typically requires knowledge of the impedance seen at the two-wire ports, which in practice varies widely and can only be estimated. As a result, the leaking signal returns to the far-side talker as an echo. The situation can be further complicated by the presence of two-wire toll switches, allowing intermediate four-two-four wire conversions internal to the network. In telephone connections using satellite links with round-trip delays on the order of 600 ms, line echoes can become particularly disruptive.

Acoustic echoes, on the other hand, typically occur in telecommunications networks due to acoustic coupling between, for instance, a loudspeaker and a microphone (e.g., in a speakerphone) During a teleconference, where two or more parties are connected by a full-duplex link, an acoustic reflection of the far-side talker through the near-side conference room is returned to the far-side talker as an echo. Acoustic echo cancellation tends to be more difficult than line echo cancellation since the duration of the acoustic echo is usually several times longer ($100 \propto 400$ ms) than typical electrical line echoes (20 ms). In addition, the acoustic echo may change rapidly at any time due to opening doors, moving persons, changing temperatures, etc., within the conference room. In other words, environmental factors may tend to exacerbate the acoustic echo heard through such devices making them more problematic to offset than their line echo counterparts.

Echo suppressors have been developed to control line echoes in telecommunications networks. Unfortunately, echo suppressors are generally ineffective during "double-talk" when talkers at both ends are talking simultaneously. During double-talk, the four-wire transmit port carries both the near-side signal and the far-side echo signal. Furthermore, echo suppressors tend to produce speech clipping, especially during long delays caused by satellite links.

Echo cancellers have been developed to overcome the shortcomings of echo suppressors. Typically, single-path echo cancellers include an adaptive filter and a subtracter. In operation, an incoming signal, for example in a conventional speakerphone, is received from a far-side talker and is heard through a speaker by a near-side talker. Unfortunately, the incoming signal is also received through the near-side microphone, which is typically positioned close to the near-side speaker. The incoming signal heard back through the near-side microphone results in an acoustic echo, which is then heard by the far-side talker. To combat this echo, the incoming signal is also applied to the adaptive filter when it first enters the echo canceller; the adaptive filter generates a replica signal of the incoming signal in an attempt to model the echo signal. To accomplish this, the replica signal and the intended outgoing signal, which includes the echo signal, are applied to the subtracter. The subtracter subtracts the replica signal from the outgoing signal in an effort to eliminate or "cancel" the echo signal.

The resulting signal, after the cancellation, is called an error signal, since it may be analyzed to determine how much of the echo signal remains after cancellation. The error signal is fed back to the adaptive filter, which adjusts its internal filter coefficients in order to maximize cancellation of the echo signal and minimize the error signal. In this manner, the filter coefficients converge (hence, an "adaptive" filter) toward values that optimize the replica signal in order to cancel, at least as much as possible, the echo signal.

However, during double-talk, speech at the near-side that acts as uncorrelated noise causes the filter coefficients in an adaptive filter to diverge (or drift). In an effort to alleviate this problem, double-talk detectors, which are commonly known in the art, are often used for disabling the "adaptation" (or converging) during double-talk. Unfortunately, double-talk detectors typically fail to indicate the presence of double-talk for a time period (e.g., a whole syllable) after double-talk begins. During this time period, the filter coefficients may continue to adapt, causing unwanted divergence or drift. Furthermore, double-talk becomes increasingly difficult to detect with such devices as an acoustic echo becomes large in comparison to the near-side signal.

To overcome this double-talk problem, two-path adaptive echo cancellers have been introduced in telecommunications networks. Typical two-path echo cancellers include a non-adaptive filter and an adaptive filter coupled in parallel. (See, for instance, U.S. Pat. No. 5,664,011, entitled "Echo Canceller with Adaptive and Non-adaptive Filter" to Crochiere, et al., which is incorporated by reference) In the two-path echo canceller structure, both filters operate on the same input signals with the intent to cancel the same echo signal. The error signal of the nonadaptive filter (e.g., the foreground filter) serves as the output for the entire structure, while the error signal of the adaptive filter (e.g., the background filter) is used only for control. The coefficients of the foreground filter are quasi-static and non-adaptive. The coefficients of the background filter are continuously adapting, as in a conventional single-path echo canceller, as described above. The background filter coefficients are used to "update" (e.g., replace) the coefficients of the foreground filter when the performance of the background filter is judged to be better than that of the foreground filter.

A primary benefit of the two-path canceller structure lies in its ability to perform very well in the presence of double-talk. A two-path canceller was introduced by Ochiai, et al. in "Echo Canceller with Two Echo Path Models," IEEE Trans. Commun., Vol. COM-25, No. 6, pp. 589–595, June 1977, which is incorporated herein by reference in its entirety. As disclosed therein, the two-path echo canceller offers a solution to the problem of double-talk detection. More specifically, since the background adaptive filter is not in the audio path of the echo canceller, any degradation of its adaptive coefficients does not directly affect the performance of the foreground filter (unless those coefficients are erroneously copied to the foreground filter), whose output signal is used as the output of the echo canceller. This is in stark contrast to conventional single-path adaptive echo cancellers, wherein any degradation of the adaptive filter's estimate of the echo signal results in an immediate increase in the residual echo level at the echo canceller's output.

Although solving the double-talk problem in theory, where all the conditions are ideal, such two-path echo cancellers have proven problematic to implement in practical situations where more heuristic comparisons are required. More specifically, prior art decision logic algorithms used for permitting or denying the copy of filter coefficients from an adaptive filter to a nonadaptive filter have proven to be extremely difficult to generate. As noted above, conventional two-path echo cancellers can solve some of the double-talk degradation problems, but only if the filter coefficients are properly updated. Unfortunately, conventional echo cancellers typically incorporate imprecise decision logic algorithms resulting in the erroneous copying of negatively adapted filter coefficients, thus degrading the echo cancellation capabilities of the echo canceller, during double-talk as well as other real-world situations.

At present, the decision logic algorithms found in conventional echo cancellers are ill-suited for the precise decisions required since they rely on multiple user-defined constants, such as decision thresholds and timers. Unfortunately, these constants vary as the application for the echo canceller vary. For example, one set of constants would be defined if the echo canceller is used in an application where predominately acoustic echo is present, whereas a different set of constants is defined in applications where predominately line echo is present. In addition, these prior art algorithms typically incorporate signal-level comparison tests for double-talk detection. As a result, these algorithms do not apply to those situations where an echo signal induces positive signal gain in the outgoing signal, a situation common in the presence of acoustic echo.

The increasing use of teleconferencing systems and desktop conferencing, and even general speakerphone use, where echo cancellers play a significant role, has led to the requirement of faster and better performing decision logic algorithms. In these and other applications there is a desire to have far better sound quality and sound localization than what has thus far been provided in the prior art, especially in double-talk situations. Accordingly, what is needed in the art is an improved system, and related method, for updating filter coefficients in echo cancellers that does not suffer from the deficiencies found in the prior art.

SUMMARY OF THE INVENTION

To address the above-discussed deficiencies of the prior art, the present invention provides a system for updating filter coefficients for an echo canceller. In one embodiment, the echo canceller includes a nonadaptive filter and an adaptive filter, the nonadaptive filter having nonadaptive filter coefficients and configured to develop a nonadaptive error signal as a function of the nonadaptive filter coefficients, and the adaptive filter having adaptive filter coefficients and configured to develop an adaptive error signal as a function of the adaptive filter coefficients. In an exemplary embodiment, the system includes a monitoring subsystem configured to monitor a quality of the nonadaptive and adaptive error signals. In addition, the system includes a selection subsystem configured to select one of the nonadaptive and adaptive filter coefficients for use by the nonadaptive filter based on the quality of the nonadaptive and adaptive error signals.

In another aspect, the present invention provides a method of updating filter coefficients for an echo canceller. In one embodiment, the method includes generating a nonadaptive error signal as a function of an incoming signal, an outgoing signal and the nonadaptive filter coefficients. In addition, the method includes generating an adaptive error signal as a function of the incoming signal, the outgoing signal and the adaptive filter coefficients. Furthermore, the method includes monitoring a quality of the nonadaptive and adaptive error signals. Then, one of the nonadaptive and adaptive filter coefficients is selected for use by the nonadaptive filter based on the quality of the nonadaptive and adaptive error signals.

In yet another aspect, the present invention provides an echo canceller incorporating the principles of the present invention. In one embodiment, the echo canceller includes a nonadaptive filter having nonadaptive filter coefficients and configured to develop a nonadaptive error signal as a function of an incoming signal, an outgoing signal and the nonadaptive filter coefficients. The echo canceller further includes an adaptive filter having adaptive filter coefficients and configured to develop an adaptive error signal as a function of the incoming signal, the outgoing signal and the adaptive filter coefficients. The echo canceller still further includes a system for updating filter coefficients having a monitoring subsystem configured to monitor a quality of the nonadaptive and adaptive error signals. The system also has a selection subsystem configured to select one of the nonadaptive and adaptive filter coefficients for use by the nonadaptive filter based on the quality of the nonadaptive and adaptive error signals.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following detailed description taken in conjunction with the accompanying FIGURES. It is emphasized that various features may not be drawn to scale. In fact, the dimensions of various features may be arbitrarily increased or reduced for clarity of discussion. Reference is now made to the following descriptions taken in conjunction with the accompanying drawings, in which:

FIG. 2 illustrates a flow diagram of a method of updating filter coefficients according to the present invention.

DETAILED DESCRIPTION

Figure 1:
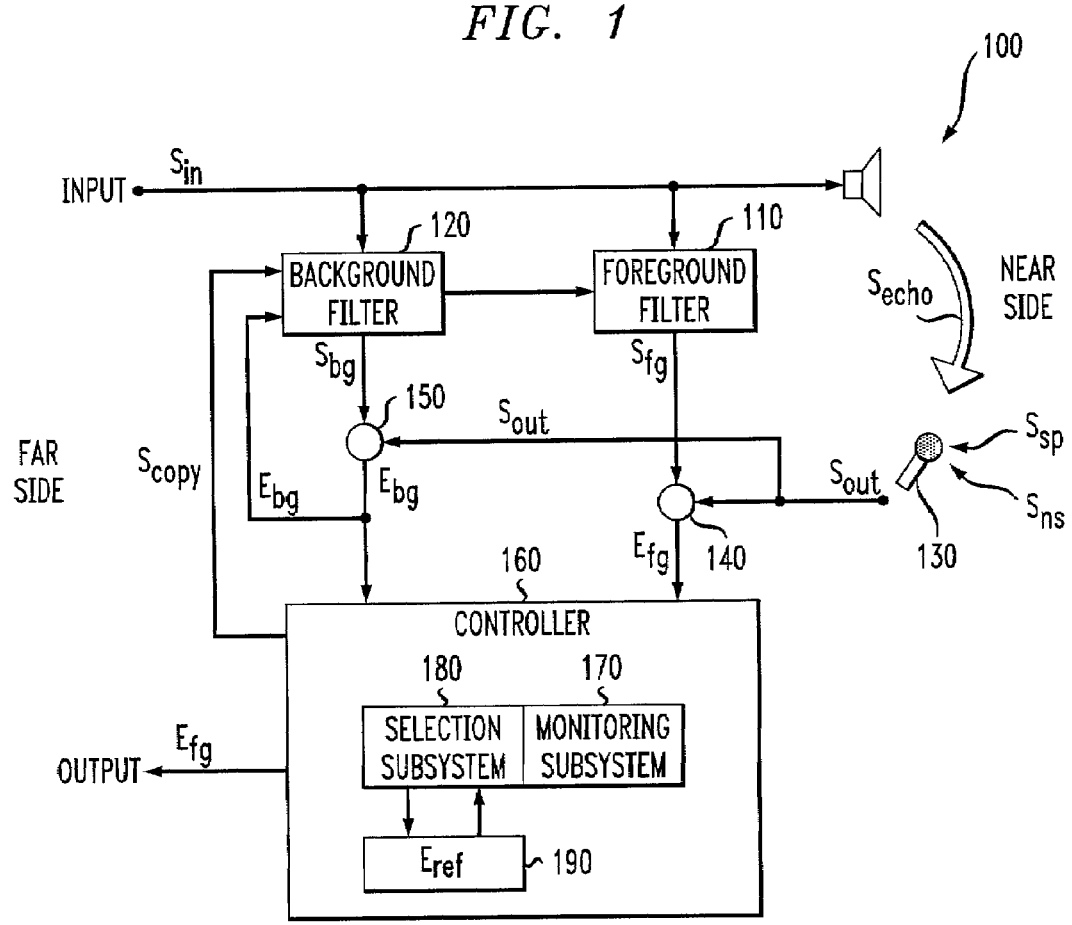
FIG. 1 illustrates one embodiment of a two-path echo canceller constructed according to the principles of the present invention.

Referring initially to FIG. 1, illustrated is one embodiment of a two-path echo canceller 100 constructed according to the principles of the present invention. As illustrated, the echo canceller 100 has a parallel filter arrangement with a programmable, nonadaptive foreground filter 110 and an adaptive background filter 120. Each of the filters 110, 120 generates a replica signal $S_{fg}$, $S_{bg}$ of an incoming signal $S_{in}$ received from a far-side. In addition, when the incoming signal $S_{in}$ is received at a near-side, the incoming signal $S_{in}$ also forms an echo signal $S_{echo}$ by being heard back through a near-side microphone 130. The echo signal $S_{echo}$ is combined with an outgoing speech signal $S_{sp}$ sent by a near-side talker, as well as with a noise signal $S_{ns}$ emanating from, for instance, the background of the near-side to form an outgoing signal $S_{out}$.

The outgoing signal $S_{out}$ is fed into both a foreground subtracter 140 and a background subtracter 150. In an advantageous embodiment, the foreground subtracter 140 subtracts the foreground replica signal $S_{fg}$ from the outgoing signal $S_{out}$ to arrive at a foreground error signal $E_{fg}$. Since the foreground filter 110 is nonadaptive and thus will not degrade during double-talk, the foreground error signal $E_{fg}$ becomes the actual output of the echo canceller 100, which is eventually transmitted to the far-side after being used for comparison by a system according to the present invention, such as a controller 160 having a monitoring subsystem 170 and a selection subsystem 180. Ideally, the foreground error signal $E_{fg}$ has had the echo signal $S_{echo}$ entirely subtracted (i.e., canceled) from it before leaving the echo canceller 100, however, in practice this is generally not the case. As a result, the echo canceller 100 of the present invention continually strives to improve the output of the foreground filter 110 by overwriting its filter coefficients with those of the background filter 120 should the background filter 120 outperform the foreground filter 110.

Those skilled in the art understand that the cancellation capability of an echo canceller, such as the echo canceller 100 illustrated and described with respect to FIG. 1, depends primarily on the filter coefficients used by the foreground and background filters 110, 120 to generate their respective replica signals $S_{fg}$, $S_{bg}$. The more accurate the foreground filter coefficients are, the more precisely the foreground filter 110 can replicate the echo signal $S_{echo}$, thus allowing the foreground subtracter 140 to cancel the echo signal $S_{echo}$ from the outgoing signal $S_{out}$. Ideally, such precision would result in a foreground error signal $E_{fg}$ comprised only of the outgoing speech signal $S_{sp}$ of the near-side talker and the near-side noise signal $S_{ns}$.

The background subtracter 150 subtracts the background replica signal $S_{bg}$ from the original outgoing signal $S_{out}$ to arrive at a background error signal $E_{bg}$. The background error signal $E_{bg}$ is then fed into the controller 160 for comparison against both the foreground error signal $E_{fg}$ and a reference value $E_{ref}$ stored in a register 190 within the controller 160. The background error signal $E_{bg}$ is also fed back into the background filter 120, making the background filter 120 adaptive in its echo cancellation function.

The monitoring subsystem 170 monitors a quality of the background error signal $E_{bg}$, the foreground error signal $E_{fg}$ and the reference value $E_{ref}$. The controller 160 first compares the quality of the background error signal $E_{bg}$ to the reference value $E_{ref}$. In an advantageous embodiment, the "quality" of each signal in the echo canceller 100 is determined by signal strength. Of course, the present invention is not limited to using signal strength as the measure of signal quality, rather other parameters such as signal loudness, signal magnitude, signal power, signal maximum magnitude, signal median magnitude, or perhaps time averages of any of these, may be employed. In an exemplary embodiment, the reference value $E_{ref}$ represents the best-attained performance (e.g., the highest quality signal attained) of the background filter 120. As a result, in one embodiment, if the controller 160 determines that the background error signal $E_{bg}$ has a higher quality than the reference value $E_{ref}$, the selection subsystem 180 selects the current background error signal $E_{bg}$ to become a new reference value $E_{ref}$ (e.g., the present best attained performance). Then, future background error signals $E_{bg}$ may be compared against the new reference value $E_{ref}$ to see if echo canceling performance has even further improved.

In addition, if the monitoring subsystem 170 determines the background error signal $E_{bg}$ to be higher quality than the reference value $E_{ref}$, the selection subsystem 180 generates a copy signal $S_{copy}$. The copy signal $S_{copy}$ is sent to the background filter 120 to cause the background filter coefficients to replace the foreground filter coefficients. However, if the monitoring subsystem 170 determines the background error signal $E_{bg}$ is not higher in quality, the reference value $E_{ref}$ is not updated. This is the case since the current background error signal $E_{bg}$ would not be representative of the best attained performance. In addition, the background filter coefficients are not copied to the foreground filter 110 by the selection subsystem 180 for the same reasons.

In accordance with the principles of the present invention, if the background error signal $E_{bg}$ is not determined to be higher quality than the reference value $E_{ref}$, the controller 160 then performs a comparison between the background error signal $E_{bg}$ and the foreground error signal $E_{fg}$. If the controller 160 determines the background error signal $E_{bg}$ has a higher signal quality than the foreground error signal $E_{fg}$ and if the background filter 120 is canceling echo, the reference value $E_{ref}$ is updated using a smoothed average involving $E_{fg}$, $E_{bg}$ and other signal quantities from FIG. 1. This is the case even if the background error signal $E_{bg}$ is not higher in quality than the reference value $E_{ref}$.

On the other hand, if the controller 160 determines the foreground error signal $E_{fg}$ has a higher signal quality (e.g., the foreground filter 110 is outperforming the background filter or the background filter coefficients have degraded due to problems such as double-talk), the selection subsystem 180 will not use the copy signal $S_{copy}$ to cause the background filter coefficients to replace the foreground filter coefficients. Instead, the foreground filter coefficients will continue to be used for the echo cancellation function. Thus, because the adaptive background filter 120 is not in the actual audio path of the echo canceller 100, any degradation of its coefficients caused by double-talk, or other problems, does not directly affect the performance of the foreground filter 110 unless those coefficients are erroneously copied into the foreground filter 110. Stated another way, the background filter 120 is not used to "adapt" the cancellation capability of the foreground filter 110 except in the absence of double-talk, unless an improper decision to copy the coefficients has been made by the controller 160. The system of the present invention used to make the decision whether to copy the coefficients is further illustrated and described with reference to FIG. 2.

Turning to FIG. 2, with continuing reference to FIG. 1, illustrated is a flow diagram 200 of a method of updating filter coefficients according to the present invention. The method begins at a Start step 205. At a step 210, the system of the present invention is initialized. More specifically, both the adaptive (background) and nonadaptive (foreground) filter coefficients are reset to zero. In addition, the average quality of the different signals such as illustrated in FIG. 1, and used for the comparisons described above, are reset to zero. In an advantageous embodiment, a smoothing parameter α may also be selected at this time for establishing average signal quality (for example, the signal strength discussed above) for each of the signals monitored by a monitoring subsystem. With reference to FIG. 1, using the single parameter α, for a time sample n, the average signal qualities (e.g., echo canceling performance) are derived by the monitoring subsystem 170 from the following equations.

$$\overline{S}_{out}(n) = \alpha \overline{S}_{out}(n-1) + (1-\alpha)|S_{out}(n)|$$

$$\overline{E}_{fg}(n) = \alpha \overline{E}_{fg}(n-1) + (1-\alpha)|E_{fg}(n)|$$

$$\overline{E}_{bg}(n) = \alpha \overline{E}_{bg}(n-1) + (1-\alpha)|E_{bg}(n)|$$

At a step 215, a first output from the nonadaptive filter (e.g., the foreground filter 110) is computed. Specifically, the nonadaptive filter generates a signal using nonadaptive filter coefficients, and this signal is used to arrive at a nonadaptive error signal, as described above. Similarly, at a step 220, a first output from the adaptive filter (e.g., the background filter 120) is computed. The adaptive filter generates a signal using adaptive filter coefficients, and this signal is used to arrive at an adaptive error signal. At a step 225, the adaptive filter coefficients are updated (e.g., "adapted") in accordance with conventional practice. Advantageously, the adaptive filter is constantly adapting with each use in an effort to achieve enhanced performance. Averages for the various signals monitored by a controller (e.g., the controller 160 of FIG. 1) are then updated at a step 230 so that echo canceling performance comparisons, in accordance with the principles of the present invention, may be performed.

At a decisional step 235, the system determines whether the performance of the adaptive filter is better than the present best attained performance. In an exemplary embodiment, this decision is made by comparing a signal quality, perhaps a signal power level, of the error signal produce by the adaptive filter and a quality of the recorded best attained performance. In such embodiments, the performance of a filter may be shown as a ratio of its output signal level to its input signal level, as in the following example for the adaptive background filter 120. It should be noted that for the following ratios, smaller ratios indicate higher quality filters.

$$\frac{\overline{E}_{bg}(n)}{\overline{S}_{out}(n)}$$

Similarly, the performance of the nonadaptive foreground filter 110 may be expressed as:

$$\frac{\overline{E}_{fg}(n)}{\overline{S}_{out}(n)}.$$

If it is determined that the quality of the adaptive error signal exceeds that of the best attained performance, illustrated by:

$$\frac{\overline{E}_{bg}(n)}{\overline{S}_{out}(n)} < \frac{\overline{E}_{ref}(n)}{\overline{S}_{best}(n)}$$

the method moves to a step 240 where the nonadaptive filter coefficients are replaced by the coefficients of the adaptive filter. Then, at a step 245, the best attained performance metric is replaced with the adaptive filter performance, since the system has found that the adaptive filter is performing at a higher level than the previously recorded reference value, as illustrated by:

$$\overline{E}_{ref}(n) = \overline{E}_{bg}(n) \text{ and } \overline{S}_{best}(n) = \overline{S}_{out}(n).$$

The method then moves to a second decision step 250. In addition, if at the first decision step 235 the system determines that the adaptive filter is not performing better than the reference value, the method also moves to the second decision step 250.

At the second decision step 250, it is first determined whether the adaptive filter is even canceling echo in the outgoing signal. In an exemplary embodiment, the strength of the adaptive error signal should be found to be lower than the strength of the outgoing signal. Referring to the signals illustrated in FIG. 1, this may be shown by:

$$\overline{E}_{bg}(n) < \overline{S}_{out}(n).$$

In addition, it is determined whether the adaptive filter is performing better than the nonadaptive filter. As before, in an illustrative embodiment, the strength of the adaptive error signal is compared to (and should be found to be less than) the strength of the nonadaptive error signal. Again referring to the signals in FIG. 1, this may be illustrated by:

$$\overline{E}_{bg}(n) < \overline{E}_{fg}(n)$$

If both conditions are found true at the step 250, the method moves to a step 255 where the average of the best-attained performance is updated. However, if either condition is not found to be true, the best-attained performance average is not updated; however, in either case, the method returns to step 215 to begin the process over again. Those skilled in the art understand that equivalent methods may have a greater or lesser number of steps than those described herein, while remaining within the broad scope of the present invention.

By providing a coefficient updating system as disclosed herein, the present invention provides several benefits over the prior art. For instance, the present invention provides for echo cancellation that converges more rapidly on the echoed signal to be canceled than cancellers found in the art primarily because none of the user-defined threshold constants found in the prior art are necessary by the system. Those skilled in the art understand that the quicker an echo canceller can converge on the intended signal, the less distortion an outgoing signal, as well as the receiver of that signal, experiences. Furthermore, echo cancellation according to the present invention allows for greater applicability in those environments where the echo signal also introduces signal gain to the echo canceller. Moreover, in those embodiments where a single smoothing parameter is used to monitor and compare the relative qualities of the various signals, a relatively streamlined echo canceller, with less user-defined constants than canceller found in the prior art, is possible. Those skilled in the art will immediately recognize the advantages of such embodiments. Also, regardless of the embodiment implemented, the present invention is employable in almost any device where echo cancellation may be appreciated, while still retaining important benefits such as those described above. Additionally, the system of the present invention may be embodied in hardware, software or a combination thereof.

Although the present invention has been described in detail, those skilled in the art should understand that they can make various changes, substitutions and alterations herein without departing from the spirit and scope of the invention in its broadest form.

What is claimed is:

1. A system for updating filter coefficients for an echo canceller having a nonadaptive filter and an adaptive filter, said nonadaptive filter having nonadaptive filter coefficients and configured to develop a nonadaptive error signal as a function of said nonadaptive filter coefficients, said adaptive filter having adaptive filter coefficients and configured to develop an adaptive error signal as a function of said adaptive filter coefficients, said system, comprising:
    a monitoring subsystem configured to monitor a quality of said nonadaptive and adaptive error signals; and
    a selection subsystem configured to select one of said nonadaptive and adaptive filter coefficients for use by said nonadaptive filter solely based on a comparison of said quality of said adaptive error signal to a reference value.

2. The system as recited in claim 1 wherein said selection subsystem is further configured to update said reference value based on a comparison of said quality of said nonadaptive and adaptive error signals regardless if said quality of said adaptive error signal exceeds said reference value.

3. The system as recited in claim 1 wherein said quality of said nonadaptive error signal is a ratio of said nonadaptive error signal to an outgoing signal and said quality of said adaptive error signal is a ratio of said adaptive error signal to said outgoing signal.

4. The system as recited in claim 1 wherein said monitoring subsystem is further configured to monitor an average quality of said nonadaptive and adaptive error signals as a function of a smoothing parameter.

5. The system as recited in claim 1 wherein said nonadaptive filter is a foreground filter and said adaptive filter is a background filter.

6. The system as recited in claim 1 wherein said quality is represented by a signal strength level.

7. The system as recited in claim 1 wherein said selection subsystem is further configured to replace said reference value with said adaptive error signal when said quality of said adaptive error signal exceeds said reference value.

8. A method of updating filter coefficients for an echo canceller having a nonadaptive filter and an adaptive filter, said nonadaptive filter having nonadaptive filter coefficients and said adaptive filter having adaptive filter coefficients, said method, comprising:
    generating a nonadaptive error signal as a function of an incoming signal, an outgoing signal and said nonadaptive filter coefficients;
    generating an adaptive error signal as a function of said incoming signal, said outgoing signal and said adaptive filter coefficients;
    monitoring a quality of said nonadaptive and adaptive error signals;
    selecting one of said nonadaptive and adaptive filter coefficients for use by said nonadaptive filter solely based on a comparison of said quality of said adaptive error signal to a reference value.

9. The method as recited in claim 8 further comprising updating said reference value based on a comparison of said quality of said nonadaptive and adaptive error signals regardless if said quality of said adaptive error signal exceeds said reference value.

10. The method as recited in claim 8 wherein said quality of said nonadaptive error signal is a ratio of said nonadaptive error signal to said outgoing signal and said quality of said adaptive error signal is a ratio of said adaptive error signal to said outgoing signal.

11. The method as recited in claim 8 wherein said monitoring further includes monitoring an average quality of said nonadaptive and adaptive error signals as a function of a smoothing parameter.

12. The method as recited in claim 8 further comprising updating said reference value employing a smoothed average associated with said nonadaptive error signal and said adaptive error signal.

13. The method as recited in claim 8 wherein said quality is represented by a signal strength level.

14. The method as recited in claim 8 further comprising replacing said reference value with said adaptive error signal when said quality of said adaptive error signal exceeds said reference value.

15. A echo canceller, comprising:
    a nonadaptive filter having nonadaptive filter coefficients and configured to develop a nonadaptive error signal as a function of an incoming signal, an outgoing signal and said nonadaptive filter coefficients; an adaptive filter having adaptive filter coefficients and configured to develop an adaptive error signal as a function of said incoming signal, said outgoing signal and said adaptive filter coefficients; and
    a system for updating filter coefficients, including:
        a monitoring subsystem configured to monitor a quality of said nonadaptive and adaptive error signals, and
        a selection subsystem configured to select one of said nonadaptive and adaptive filter coefficients for use by said nonadaptive filter solely based on a comparison of said quality of said adaptive error signal to a reference value.

16. The echo canceller as recited in claim 15 wherein said selection subsystem is further configured to update said reference value based on a comparison of said quality of said nonadaptive and adaptive error signals regardless if said quality of said adaptive error signal exceeds said reference value.

17. The echo canceller as recited in claim 15 wherein said quality of said nonadaptive error signal is a ratio of said nonadaptive error signal to said outgoing signal, and said quality of said adaptive error signal is a ratio of said adaptive error signal to said outgoing signal.

18. The echo canceller as recited in claim 15 wherein said monitoring subsystem is further configured to monitor an average quality of said nonadaptive and adaptive error signals as a function of a smoothing parameter.

19. The echo canceller as recited in claim 15 wherein said nonadaptive filter is a foreground filter and said adaptive filter is a background filter.

20. The echo canceller as recited in claim 15 wherein said quality is represented by a signal strength level.

21. The echo canceller as recited in claim 15 wherein said selection subsystem is further configured to replace said reference value with said adaptive error signal when said quality of said adaptive error signal exceeds said reference value.

* * * * *